I. PERRIS.

FILLER FOR EGG CRATES AND THE LIKE.

APPLICATION FILED MAR. 10, 1921.

Reissued Mar. 28, 1922. 15,321.

Inventor

Isidor Perris

By Day, Oberlin & Day

Attorneys

UNITED STATES PATENT OFFICE.

ISIDOR PERRIS, OF CLEVELAND, OHIO.

FILLER FOR EGG CRATES AND THE LIKE.

15,321. Specification of Reissued Letters Patent. Reissued Mar. 28, 1922.

Original No. 1,347,909, dated July 27, 1920, Serial No. 317,715, filed August 15, 1919. Application for reissue filed March 10, 1921. Serial No. 451,288.

*To all whom it may concern:*

Be it known that I, ISIDOR PERRIS, a citizen of the United States, and a resident of Cleveland, county of Cuyahoga, and State of Ohio, have invented a new and useful Improvement in Fillers for Egg Crates and the like, of which the following is a specification, the principle of the invention being herein explained and the best mode in which I have contemplated applying that principle, so as to distinguish it from other inventions.

The present invention relates as indicated to fillers for egg crates and the like and more particularly to a filler in which provision is made for the adequate protection of the articles to be packed therein against breakage or contact with each other. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
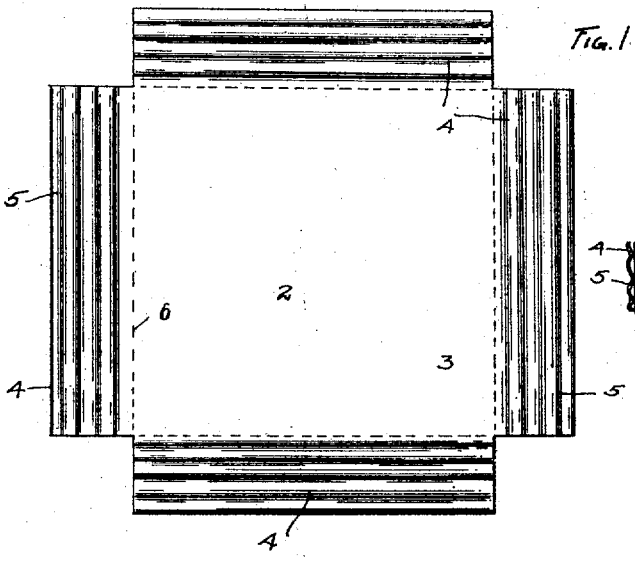
Figure 3:
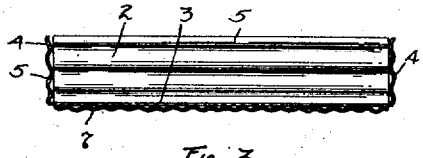
Figure 2:
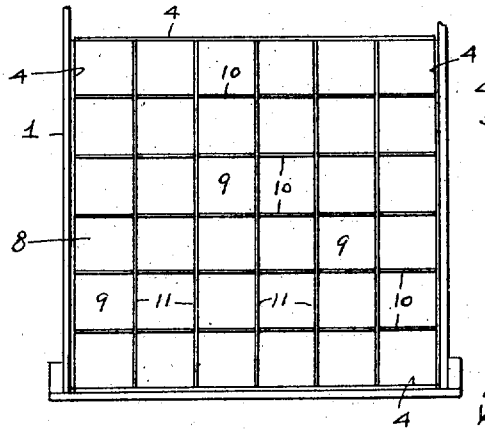
Figure 4:
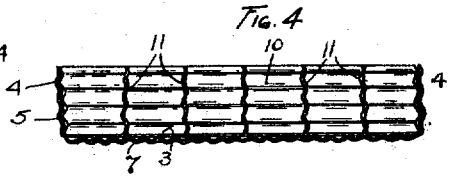
Figure 6:
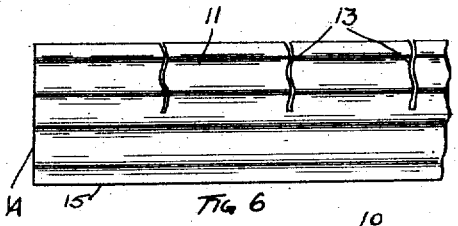
Figure 5:
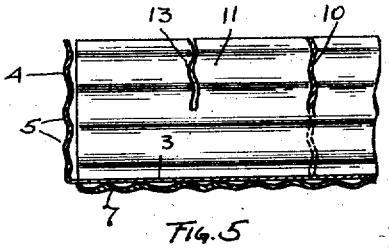

Fig. 1 is a plan view of one member of the filler before being folded into operative condition; Fig. 2 is a plan view of the filler in position in a crate; Fig. 3 is a vertical section through the member shown in Fig. 1 in a folded condition; Fig. 4 is a vertical section through the completed filler; Fig. 5 is a vertical section through the edge of a completed filler showing a partition in place; Fig. 6 is an elevation of a partition; and Fig. 7 is an elevation of a partition showing a modified form of end therefor, and Fig. 8 is an elevation of the partition which interlocks at right angle to the partition shown in Fig. 7.

The filler herewith shown is to be used in the shipment of eggs or like articles and is adapted to fit within a case 1 of wood or other suitable material usually employed for such purpose. The filler 2 comprises a bottom piece or sheet 3 of relatively plane or flat cardboard or the like, provided with side pieces or ends 4 integral therewith. The side pieces are corrugated as at 5, the corrugations thereon running the long way of side that is parallel to the plane of the bottom. The side pieces 4 are adapted to be bent at right angles to the bottom 3 as shown by the dotted line 6 in Fig. 1. A sheet of corrugated board 7 is glued or otherwise joined to the underside of the bottom 3 forming therewith a base of cellular construction which forms a cushion between each filler, the fillers being inserted one on the other in the case 1.

A division member 8 is provided for the filler and is adapted to be inserted therein forming a plurality of separate compartments 9 for the articles to be shipped. The construction of the division member 8 is of particular interest and consists of a plurality of strips 10 of corrugated material parallel to each other, and another plurality of strips 11 of the same material crossing the first mentioned strips at right angles thereto, the corrugations thereon running the long way of strips, that is, in the same line as the corrugations on the end pieces 4 with which the strips are parallel. The strips 10 and 11 are the same height as the ends 4 and are provided with slots 12 and 13 extending to the center line of each strip, the slots 12 of the strips 10 extending downwardly from upper edge of the strips 11. The path of each of the slots 12 and 13 is made to conform to the corrugations of the individual strips, thereby forming an accurate and substantial joint at the intersection of each of the strips 10 and 11.

Figure 7:
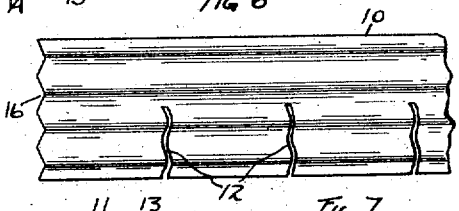
Figure 8:
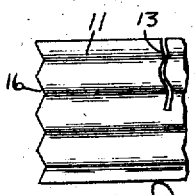

As shown in Figs. 6 and 7 I have shown two forms of ends for the strips 10 and 11. In Fig. 6 the ends 14 are shown plain, that is, vertical to the base line 15, while in Fig. 7 the ends are notched as at 16, the notches corresponding to the corrugations in the ends 4. By means of this construction a snug and firm contact is derived at the junction of the ends 4 of the filler 2 and division strips 10 and 11.

When the fillers are shipped from the factory the base members 2 are opened flat as shown in Fig. 1 and the division members are assembled and folded together in the same manner as the division members now employed in devices of this character.

As will be seen I have constructed a filler for egg crates and the like which is simple in construction and of few parts, the ends and division member being constructed of sheets of material of a single thickness and not being built up of two or more layers of material as is usually employed when corrugated material is used.

The strips in the divisional member are so arranged that I employ four less strips than are used in the fillers now on the market, it being necessary to have end strips around the outer edge of the divisional members to form the partitions around the periphery of the member. The single thickness of corrugated material employed has been found to offer substantial protection against breakage of the eggs or other articles packed therein, while the reinforcing of the bottom by means of a separate sheet of corrugated board furnishes a very efficient and protective cushion between each unit in the crate.

The fillers are made of such a size as to snugly fit within the crate and thereby eliminate all possibility of the filler moving or shifting about in the crate. The size of the compartments and the use of the corrugated material prevent the shaking of the eggs therein and thereby prevent the mixing of the yolk and the white which renders the egg useless and unfit for sale.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A filler for crates, comprising a bottom member having side-walls integral therewith, said side-walls being formed with corrugations parallel to the plane of the bottom member, and a division member comprising a plurality of interlocking strips adapted to fit within such side-walls, the ends of such strips being extended to contact with the corrugations on such side-walls.

2. A filler for crates, comprising a bottom member having side-walls integral therewith, said side-walls being formed with corrugations parallel to the plane of the bottom member, and a division member comprising a plurality of interlocking strips adapted to fit within such side-walls, the ends of such strips being notched to interlock with the corrugations on such side-walls.

3. A filler for crates comprising a bottom member of substantially plane surface having side walls integral therewith, such side walls being corrugated, the corrugations thereon being parallel to the plane of said bottom member, a sheet of corrugated material attached to the lower surface of said bottom member and a division member adapted to substantially fit within said filler, said division member comprising a plurality of interlocking strips of corrugated material, the corrugations on such strips being parallel to the plane of said bottom member.

4. A filler for crates comprising a sheet of substantially flat material having side walls integral therewith, said side walls being corrugated, the corrugations thereon extending the long way of said side walls, a sheet of corrugated material attached to the lower surface of said flat material, and a division member adapted to fit within said filler and adapted to form a plurality of compartments therein, said division member comprising a plurality of interlocking corrugated strips substantially at right angles to each other, the corrugations on said strips being parallel to the corrugations on said side walls respectively.

5. A filler for crates comprising a bottom piece of relatively flat material having side walls integral therewith, said side walls being corrugated, the corrugations thereon being parallel to the plane of said bottom piece, a sheet of corrugated material attached to the lower surface of said bottom piece, and a plurality of strips of corrugated material having slots thereon, whereby said strips are adapted to interlock at right angles to each other, the contour of such slots corresponding to the corrugations on said strips.

6. A filler for crates comprising a bottom piece of relatively flat material having side walls integral therewith such side pieces having horizontal corrugations thereon, a sheet of corrugated material attached to the lower surface of said bottom piece, and a division member comprising a plurality of interlocking corrugated strips adapted to fit within said filler, the ends of such strips being notched and adapted to substantially engage such corrugations on said side walls.

Signed by me this second day of March, 1921.

ISIDOR PERRIS.